US007278615B2

(12) United States Patent
Schubert et al.

(10) Patent No.: US 7,278,615 B2
(45) Date of Patent: Oct. 9, 2007

(54) COUPLING MECHANISM WITH A MOBILE INFUSION UNIT

(75) Inventors: Werner Schubert, Weissenberg (DE); Rudolf Marka, Munich (DE); Peter Mueller, Grosshelfendorf (DE)

(73) Assignee: Trumpf Kreuzer Medizin Systeme GmbH + Co. KG, Puchheim (DE)

( * ) Notice: Subject to any disclaimer, the term of this patent is extended or adjusted under 35 U.S.C. 154(b) by 102 days.

(21) Appl. No.: 11/077,378

(22) Filed: Mar. 11, 2005

(65) Prior Publication Data

US 2005/0211858 A1 Sep. 29, 2005

(30) Foreign Application Priority Data

Mar. 12, 2004 (EP) .................................. 04006007

(51) Int. Cl.
*F16M 13/00* (2006.01)

(52) U.S. Cl. .................. 248/125.2; 248/322; 248/327; 248/317; 280/35; 211/207; 403/322.4; 403/323

(58) Field of Classification Search ............. 248/282.1, 248/122.1, 125.2, 322, 327; 280/35, 47.35; 5/600; 403/323, 322.4, 322.1, 321; 52/36.1, 52/36.4; 211/207, 86.01, 106.01
See application file for complete search history.

(56) References Cited

U.S. PATENT DOCUMENTS 4,023,771 A * 5/1977 Walchek ..................... 249/139
4,795,122 A * 1/1989 Petre .......................... 248/317
5,319,816 A * 6/1994 Ruehl ............................ 5/600
5,344,169 A * 9/1994 Pryor et al. ................ 280/79.3
5,639,059 A * 6/1997 Nash .......................... 248/619
5,898,961 A * 5/1999 Ambach et al. ............... 5/600
6,073,942 A * 6/2000 Heneveld, Sr. ........ 280/33.991
6,179,260 B1 * 1/2001 Ohanian ................ 248/229.16
6,213,481 B1 * 4/2001 Marchese et al. ............. 280/35
2003/0014817 A1 * 1/2003 Gallant et al. ................. 5/600

FOREIGN PATENT DOCUMENTS

| | | |
|---|---|---|
| DE | 39 17 892 | 12/1990 |
| EP | 0 966 944 | 12/1999 |
| WO | WO 00/09061 | 2/2000 |

* cited by examiner

*Primary Examiner*—Carl D. Friedman
*Assistant Examiner*—Bradley Duckworth
(74) *Attorney, Agent, or Firm*—Fish & Richardson P.C.

(57) ABSTRACT

A coupling mechanism for selectively coupling an equipment rack to a stationary receptacle unit and to a mobile equipment cart, the coupling mechanism includes a suspension mount disposed on the equipment rack, a first receptacle element, and a second receptacle element. The first receptacle element is disposed on the stationary receptacle unit and configured to receive the suspension mount of the equipment rack to support the equipment rack on the stationary receptacle unit. The second receptacle element disposed on the mobile equipment cart and configured to receive the suspension mount of the equipment rack to support the equipment rack on the equipment cart. The second receptacle element is movable along a column of the equipment cart.

26 Claims, 4 Drawing Sheets

COUPLING MECHANISM WITH A MOBILE INFUSION UNIT

CLAIM OF PRIORITY

This application claims priority under 35 USC §119(a) to European Patent application number 04 006 007. 1, filed on Mar. 12, 2004, the entire contents of which are hereby incorporated by reference.

TECHNICAL FIELD

This disclosure relates to a coupling mechanism for coupling a mobile equipment cart to a medical equipment rack.

BACKGROUND

In many cases, patients in a hospital's intensive care unit must be connected to medical equipment or receive infusions. The equipment required to this end generally is stored on an equipment rack that is, for example, coupled to a wall-mounted or ceiling-mounted stand.

In order to ensure continued patient care while a patient is being transported inside a hospital, the patient must remain connected to the medical equipment that is used to treat the patient. Medical equipment is often supported on an equipment rack, and it can be necessary to remove the equipment from the rack to transport the equipment with the patient. The medical equipment can be, for example, an infusion unit that may be provided both in the operating theater and in intensive care units and that can be carried on a ceiling- or wall-mounted stand. The infusion unit can include pump rods, with several motor-driven infusion pumps or syringe pumps or simple gravity infusion bottles that are usually attached to the pump rods. To transport the patient with the medical equipment, an equipment rack (e.g., a rack for carrying an infusion unit) generally must be removed from a ceiling-mounted or wall-mounted stand and moved along with the hospital bed that accommodates the patient.

An infusion supply apparatus (e.g., as disclosed in German Patent document No. P 39 17 892) can include a tray with supply connections, and the tray can include, on the one hand, a connection to the stationary stand (i.e., the ceiling-mounted or wall-mounted stand) and, on the other hand, a connection to a mobile cart, both connections being detachable.

The mobile cart can include an arm on which the tray of the infusion supply apparatus can be supported. Transfer of the infusion supply apparatus from the stationary stand to the mobile cart can be achieved by moving the arm of the mobile cart underneath the tray of the infusion supply apparatus, so that said arm is arranged underneath the tray and engages the tray. Thereafter, the arm is lifted upwards slightly so that it carries the tray including the infusion supply apparatus. This principle is similar to the working method of a forklift. However, this solution is expensive in its construction and complicated in its handling.

SUMMARY

In a first general aspect, a coupling mechanism for selectively coupling an equipment rack to a stationary receptacle unit and to a mobile equipment cart, the coupling mechanism includes a suspension mount disposed on the equipment rack, a first receptacle element, and a second receptacle element. The first receptacle element is disposed on the stationary receptacle unit and configured to receive the suspension mount of the equipment rack to support the equipment rack on the stationary receptacle unit. The second receptacle element disposed on the mobile equipment cart and configured to receive the suspension mount of the equipment rack to support the equipment rack on the equipment cart. The second receptacle element is movable along a column of the equipment cart.

Implementations can include one or more of the following features. For example, the suspension mount can include a crossbar extending essentially in a horizontal direction. The second receptacle element can be movable in a vertical direction along the column of the equipment cart.

The second receptacle element can include a coupling link extending essentially in a horizontal direction, and the column can include a spacing element extending in parallel to the link, and a swivel attached to the spacing element at a swivel axis and having a bolt disposed at a distance from the swivel axis and extending essentially in a horizontal direction through the coupling link can pivot about the swivel axis. The swivel can include a handle.

The column can define a vertical slot though which the second receptacle slides. At least one of the second receptacle element and the column can include rollers for mutual guidance between the second receptacle element and the column when the second receptacle element and the column are moved vertically in relation to each other. A pneumatic spring can be attached to the column and the second receptacle element and can supports vertical movement of the second receptacle element.

The second receptacle element can include two vertically spaced receptacles adapted for receiving the suspension mount, and the second receptacle element can include a hook for receiving the suspension mount. The suspension mount can include a first front crossbar adapted for coupling to the mobile equipment cart and a first rear crossbar adapted for coupling to the stationary receptacle unit. The suspension mount can further include a second front crossbar spaced apart from the first front crossbar in a vertical direction. The suspension mount can further include a second rear crossbar spaced apart from the first rear crossbar in a vertical direction. The equipment rack can include two carrier profiles that are connected to each other via the crossbars.

The link can define a recess at an end of the link through which the bolt is located when the receptacle is in a lifted position.

In another general aspect, a hospital room medical equipment rack transfer system includes a stationary rack mount disposed within a hospital room, a mobile equipment cart sized to be wheeled into and out of the room, and an equipment rack adapted to support a variety of medical equipment coupled to a patient and including a support member. The stationary rack mount includes a first coupler adapted to receive the support member of the equipment rack to secure the equipment rack. The mobile equipment cart includes a second coupler adapted to receive the support member of the equipment rack to secure the equipment rack to the mobile equipment cart to move the equipment rack into or out of the room. The second coupler is adapted to be vertically moved with respect to the mobile equipment rack to release the equipment rack from the stationary rack mount.

Implementations can include one or more of the following features. For example, the mobile equipment cart can further include a swivel member coupled to the second coupler and adapted to swivel about a fixed swivel axis and thereby move the second coupler vertically, such that the second coupler releases the equipment rack from the stationary rack mount and secures the equipment rack to the mobile equipment cart. The swivel member can include a bolt substantially parallel to and located at a distance from the swivel axis, wherein the bolt engages a substantially horizontal slot of the second coupler, such that swivel motion of the swivel member about the swivel axis is converted into vertical motion of the second coupler.

In a further general aspect, a method of transferring a medical equipment rack from a hospital room with an attached patient, can include providing a mobile equipment cart having a coupler adapted to receive a support member of the equipment rack to secure the equipment rack to the mobile equipment cart to move the equipment rack with the patient into or out of the room, moving the mobile equipment cart into a coupling position adjacent the equipment rack while the equipment rack is secured to a stationary rack mount in the hospital room, operating a handle of the mobile equipment cart to simultaneously couple the equipment rack to the mobile equipment cart and release the equipment rack from the stationary rack mount while a patient is connected to equipment on the equipment rack, and then wheeling the mobile equipment cart and coupled equipment rack from the room with the connected patient.

In one exemplary implementation operating the handle can consist essentially of pivoting the handle about a swivel axis.

DESCRIPTION OF DRAWINGS

Like reference symbols in the various drawings indicate like elements.

DETAILED DESCRIPTION

Figure 1:
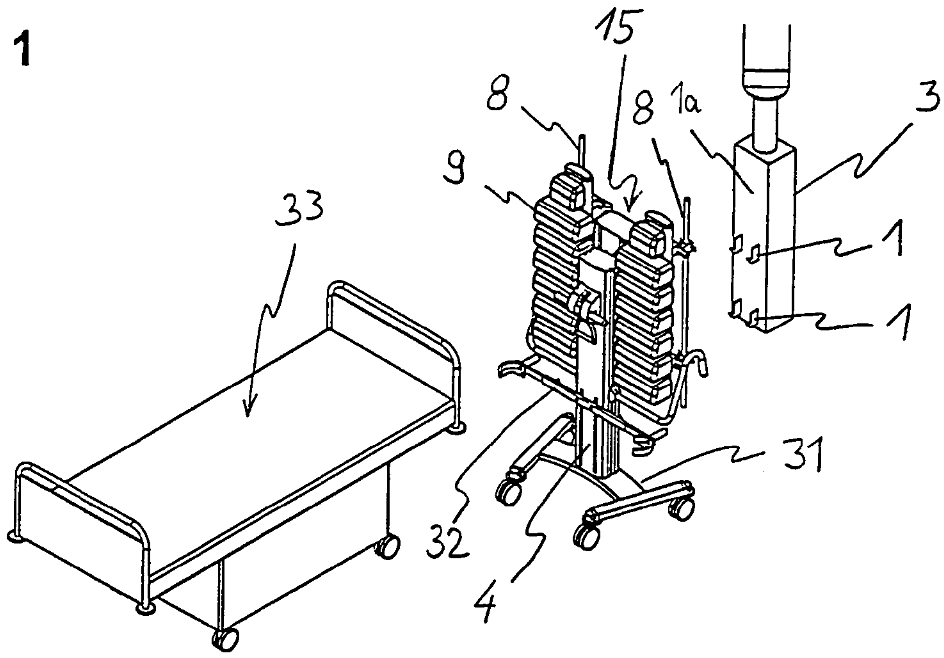
FIG. 1 is a perspective view of a mobile equipment cart, a ceiling-mounted stand and a hospital bed.

FIG. 1 shows a schematic view of a stationary receptacle unit 3 in the form of a stand head of a medical ceiling-mounted stand, a mobile equipment cart 15, and a hospital bed 33. On a front side 1*a* of the stationary receptacle unit 3, the unit includes stationary receptacle elements 1 that are designed as hooks. For example, a total of four hook-shaped receptacle elements 1 can be provided, every two of which are arranged next to each other as a pair and wherein two pairs of hooks can be arranged adjacent to each other and spaced apart from each other in a vertical direction. The hooks are bent slightly upwards to ensure secure hooking in.

The mobile equipment cart 15 includes a carriage 31 with a column 4 attached thereon. A docking device 32 is provided on the column to dock the mobile equipment cart to the hospital bed 33.

Figure 2:
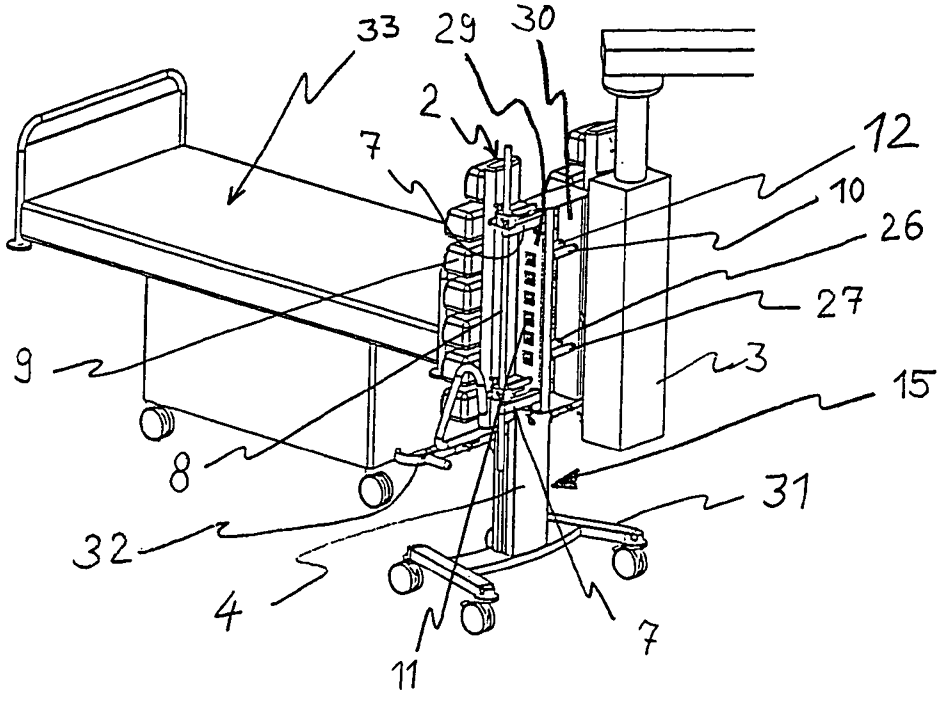
FIG. 2 is a view of the situation of FIG. 1 from a different perspective.

As shown in FIG. 2, the mobile equipment cart 15 includes a pump rod carrier 2 coupled to the column 4. As shown, the pump rod carrier includes two carrier profiles 29 and 30 that are connected to each other by means of crossbars 10 and 12. Horizontal retaining arms 7 are mounted to the outwardly pointing sides of the carrier profiles 29 and 30 which, in turn, retain pump rods 8, as can be seen both from FIG. 1 and FIG. 2. Syringe pumps 9 are attached to the pump rod 8. The outwardly pointing sides of the carrier profiles 29 and 30 can be provided with power outlets 11. The electric connection of the pump rod carrier 2 to an external power supply must then only be established via one or two connections. Moreover, batteries may be provided at the pump rod carrier 2, thus allowing battery operation of the mobile infusion unit 15 in the event that motor syringes, etc. are temporarily disconnected from the external power supply.

Figure 3:
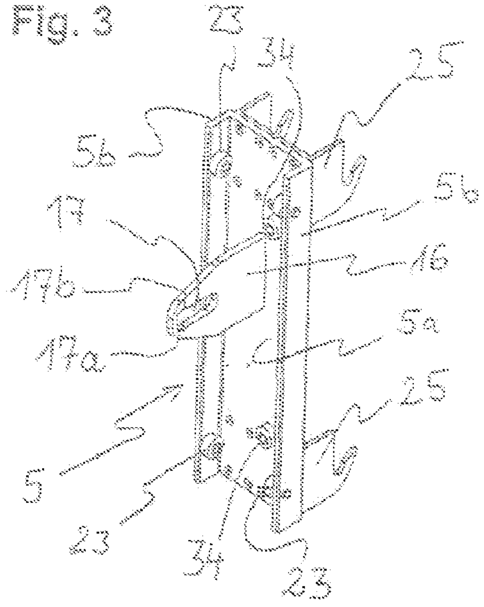
FIG. 3 is a detailed perspective view of a movable receptacle.

As shown in FIG. 3, the movable receptacle 5 has a C-shaped profile with a wide base 5*a* and short sides 5*b*, and receptacle elements 25 are provided on the side of the base 5*a* facing away from the sides 5*b*. These hook-shaped receptacle elements 25 are similar to the hook-shaped receptacle elements 1 (shown in FIG. 1) are attached to the stand head 3. Accordingly, two pairs of receptacle elements 25 that are each arranged adjacent to each other in horizontal direction are provided on the movable receptacle 5 here as well. Moreover, rollers 23 that are supported rotatably are provided at the short sides 5*b* on their sides that are facing each other. Furthermore, rollers 34 are provided at the base 5*a* of the C-shaped profile of the movable receptacle 5. These rollers 34 are mounted such that their rotary axes are aligned in parallel to the short sides.

As shown in FIG. 3, a link element 16 extends along the central axis of the movable receptacle 5, perpendicularly to the base 5*a* of the C-shaped profile and parallel to the short sides 5*b*. The link element 16 has the shape of a flap and is provided with a link 17 in the form of a horizontally extending elongated hole. On its side facing away from the base 5*a* of the C-shaped profile, the link 17 includes two recesses 17*a* and 17*b* that are pointing up and down in the assembled state.

Figure 4:
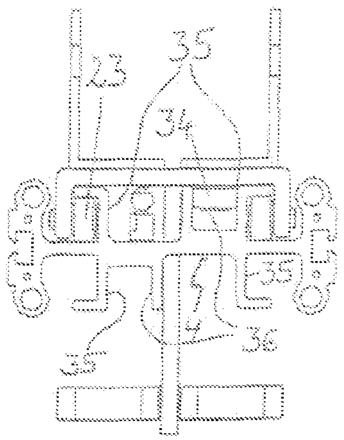
FIG. 4 is a detailed cross-profileal view of the movable receptacle of FIG. 3 and of a column of the mobile equipment cart.

As shown in FIG. 4, the rollers 23 serve to guide the movable receptacle 5 in the column 4. The column 4 has a profile that is appropriate to that end and, in its cross-profile, includes several rectangular ribs 35, with the rollers 23 running along said ribs 35. Furthermore, the column 4 includes on each of its sides a rectangularly extending rib 36 in its central region. Together with a rear side of a rib 35, said rib 36 serves to guide the rollers 34. These interlocking profiles of the movable receptacle 5 and the column 4 permit a stable and consistent guidance of the movable receptacle 5 in its up and down movement.

Figure 6:
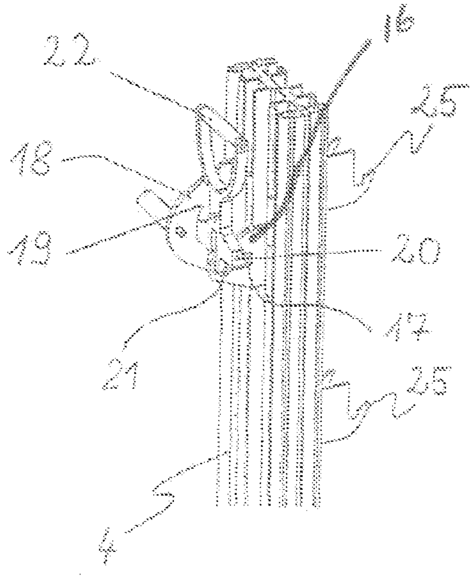
FIG. 6 is a view of the perspective representation of FIG. 5 from a different perspective.

As shown in FIG. 6, a spacing element 18 that is also designed in the shape of a flap and extends in parallel to the link element 16 is attached to column 4. A swivel element 19 that is provided with a handle 22 is pivoted to the spacing element 18. Pivoted mounting is achieved via a swivel axis 20. As shown in FIG. 4, the link element 16 projects through a slot (not illustrated) in the column 4. This slot extends in vertical direction along the central axis of the column 4. Said slot exceeds the link element 16 in length, so that the link element 16 and, thus, the entire movable receptacle 5 can be moved in the slot. Furthermore, the swivel element 19 includes a bolt 21 that extends through the link 17. The bolt 21 and the swivel axis 20 are spaced apart from each other at a distance d, as shown in FIG. 7.

The swinging motion of the swivel element 19 and the lifting motion associated therewith of the movable receptacle 5 are illustrated in more detail below in FIGS. 6–8 and FIGS. 9*a*–9*e*.

FIG. 6 shows the swivel element 19 in a position in which the handle 22 points upwards. In this position, the mobile equipment cart 15 is moved to be coupled to the pump rod carrier 2 attached to the stand head 3. Therein, the receptacle elements 25 are in the bottommost position, as can be seen from a comparison with FIGS. 7 and 8. The swivel axis 20 and the bolt 21 are arranged on top of each other in vertical direction. The bolt 21 is located in the recess 17*a* to the outermost left-hand end of the link 17 (see FIG. 3). This position reflects the situation represented in FIG. 9*b*.

Figure 7:
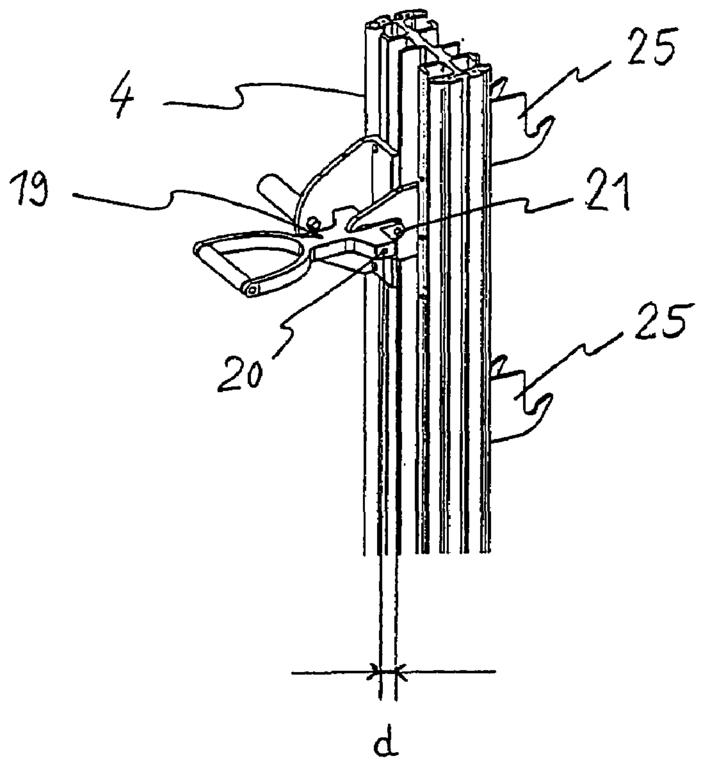
FIG. 7 is a view of the perspective representation of FIG. 6 at a different operational position.

If the handle 22 is rotated by 90 degrees in a counterclockwise direction (as viewed from the edge of column 4), the handle 22 reaches the horizontal position, as is shown in FIG. 7. In this position, the bolt 21 and the swivel axis 20 are located in a horizontal plane intersecting the link 17. Thus, the bolt 21 is forced to move in the link 17 out of its outermost position to the left shown in FIG. 6 to the outermost position to the right shown in FIG. 7. In order to allow such a movement at all, the link element 16 can be moved in a vertical direction. This is accomplished by means of the aforementioned slot in the column 4, so that the link element 16 and, thus, the entire movable receptacle 5 can move up and down. This position reflects the situation represented in FIG. 9*c*.

Figure 8:
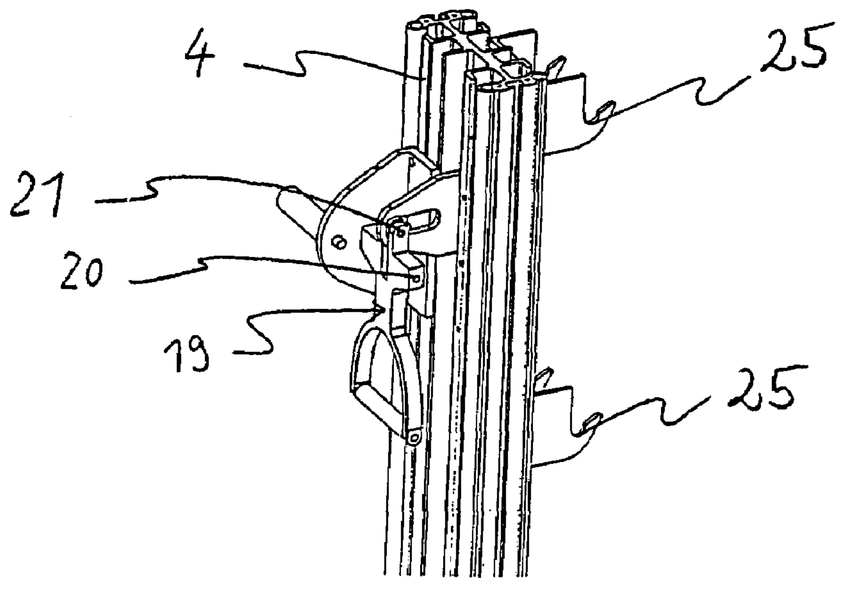
FIG. 8 is a view of the perspective representation of FIG. 6 at a different operational position.

If the handle 22 is then turned down by another 90 degrees, the position shown in FIG. 8 is reached, in which the swivel axis 20 and the bolt 21 are now again arranged on a common vertical plane. The bolt 21 is again located at the outermost left-hand position of the link 17, to be more precise in the recess 17*b*. To permit this movement, the link element 16 is moved up even further, including the movable receptacle 5 and the receptacle elements 25 attached thereto, as shown in FIG. 8. The receptacle elements 25 are now at a higher position than the receptacle elements 1 of the stand head 3. This position reflects the position shown in FIG. 9*d*.

Figure 9A:
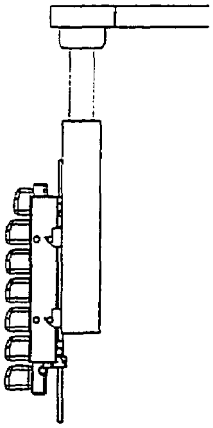
FIGS. 9*a*, 9*b*, 9*c*, 9*d*, and 9*e* illustrate a process of coupling an equipment rack to a mobile equipment cart.
Figure 9B:
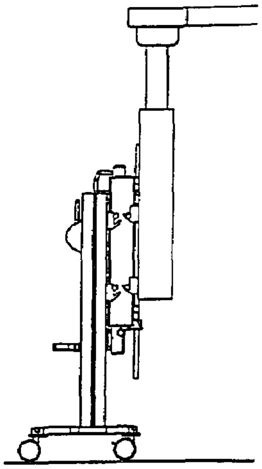
Figure 9C:
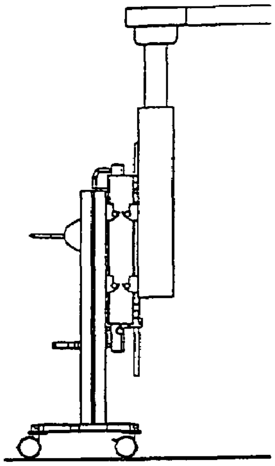
Figure 9D:
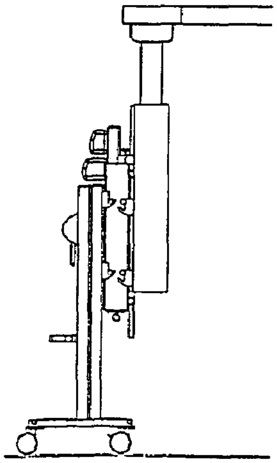
Figure 9E:
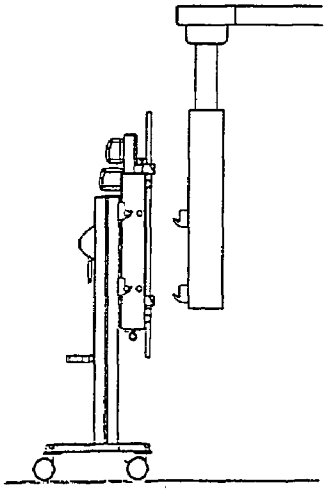

As can be seen from FIGS. 9*b*–9*d*, the pump rod carrier 2 is, as a result, moved out of the position where it is hooked in the receptacle elements 1 on the stand head 3 to a position where it is hooked in the receptacle elements 25 of the mobile infusion unit 15. As shown in FIG. 9*e*, the mobile equipment cart 15 can now be removed from the stand head 3. Thus, the transfer of the pump rod carrier 2 to the mobile equipment cart 15 is accomplished by a swivel motion of the swivel element 19 on the handle 22 by 180 degrees from top to bottom, wherein the rotary movement is converted into a straight-line lifting movement via the mechanical swivel assembly described.

Figure 5:
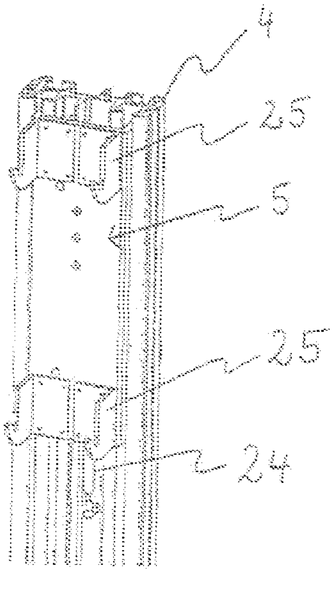
FIG. 5 is a detailed perspective view of the movable receptacle and the column of the mobile equipment cart.

In the illustrated embodiment, the lifting movement is supported by the force of a pneumatic spring 24 shown in FIG. 5. The pneumatic spring 24 is attached both to the column 4 and to the movable receptacle 5 and presses the movable receptacle 5 in an upward direction. By means of this upward movement, the rear crossbars 10 and 27 of the pump rod carrier 2 are, with the help of the receptacle elements 25 on the mobile equipment cart, lifted out of the receptacle elements 1 on the stand head 3 and the front crossbars 12 and 26 are now only supported by the receptacle elements 25.

Any unstable equilibrium that might cause the receptacle 5 to be brought out of its lifted position, which is not desirable, is prevented by the provision of the recess 17*b* in the link 17 of the link element 16 and the partial positive engagement resulting therefrom.

Moreover, it is also possible to attach further devices, such as a respirator, oxygen containers, a medical emergency kit, an isolating transformer, etc., to the mobile equipment cart.

After the devices attached to the pump rod carrier 2 have been disconnected from electrical power supply, said pump rod carrier 2 can be moved away from the stand head 3 and coupled to the hospital bed 33. By positioning the coupling mechanism on the opposite side of the receptacles for the pump rod carrier 2, it is not necessary to turn the mobile equipment cart about its vertical axis, so that the supply lines going to the patient do not have to be passed around the mobile equipment cart.

The transfer to the receptacle elements 1 at the stand head 3 is accomplished in reversed order.

Many advantages exist. For example, the swivel and lever mechanism ensures simple construction of the device and requires only low operator forces. The simple mechanics is not susceptible to faults, so that permanent and reliable operation can be ensured. A receptacle with vertical sliding ability, which is mounted to a column of the mobile equipment cart in a movable manner, ensures that the movable receptacle is guided in a defined manner, thus facilitating the coupling process. The provision of a receptacle element on a stationary receptacle unit (e.g., a medical ceiling-mounted stand and/or on a mobile equipment cart), with the receptacle element being adapted to receive the crossbar, ensures an easy coupling process.

Two vertically spaced-apart crossbars as suspension devices and two corresponding receptacles on the mobile equipment cart or on the stationary receptacle unit can prevent the mobile infusion unit from tilting while it is coupled or decoupled.

The swivel mechanics can convert a circular swinging motion into a vertical up-and-down movement, and the swivel element can serve as a lever that reduces the forces required for lifting the movable receptacle to facilitate handling thereof.

An unstable equilibrium can be prevented from developing, whereby in such an unstable equilibrium it would be easily possible to shift the movable receptacle inadvertently from the lifted position to the lowered position, because the recess in the link can ensure that the bolt remains in this position by a partial positive engagement and can be brought out of this position only by overcoming a resistance by means of increased expenditure of force.

The details of one or more implementations are set forth in the accompanying drawings and the description below. Other features and advantages will be apparent from the description and drawings, and from the claims.

OTHER IMPLEMENTATIONS

A number of implementations have been described. Nevertheless, it will be understood that various modifications may be made. Accordingly, other implementations are within the scope of the following claims.

What is claimed is:

1. A coupling mechanism for selectively coupling an equipment rack to a stationary receptacle unit and to a mobile equipment cart, the coupling mechanism comprising:

a suspension mount disposed on the equipment rack;

a first receptacle element disposed on the stationary receptacle unit and configured to receive the suspension mount of the equipment rack to support the equipment rack on the stationary receptacle unit;

a second receptacle element, disposed on the mobile equipment cart and configured to receive the suspension mount of the equipment rack to support the equipment rack on the equipment cart, wherein the second receptacle element comprises a coupling link extending essentially in a horizontal direction and the second receptacle element is movable along a column of the equipment cart, the column comprising a spacing element extending in parallel to the coupling link, and a swivel attached to the spacing element at a swivel axis about which the swivel is adapted to be pivoted, wherein the swivel comprises a bolt disposed at a distance from the swivel axis and extending essentially in a horizontal direction through the coupling link.

2. The coupling mechanism of claim 1, wherein the suspension mount comprises a crossbar extending essentially in a horizontal direction.

3. The coupling mechanism of claim 1, wherein the second receptacle element is essentially movable in a vertical direction along the column of the equipment cart.

4. The coupling mechanism of claim 1, wherein the swivel comprises a handle.

5. The coupling mechanism of claim 1, wherein the column defines a vertical slot though which the second receptacle slides.

6. The coupling mechanism of claim 1, wherein at least one of the second receptacle element and the column comprises rollers for mutual guidance between the second receptacle element and the column when the second receptacle element and the column are moved vertically in relation to each other.

7. The coupling mechanism of claim 1, further comprising a pneumatic spring attached to the column and the second receptacle element, wherein the pneumatic spring supports vertical movement of the second receptacle element.

8. The coupling mechanism of claim 1, wherein the second receptacle element comprises two vertically spaced receptacles adapted for receiving the suspension mount.

9. The coupling mechanism of claim 1, wherein the second receptacle element comprises a hook for receiving the suspension mount.

10. The coupling mechanism of claim 1, wherein the suspension mount comprises:

a first front crossbar adapted for coupling to the mobile equipment cart; and a first rear crossbar adapted for coupling to the stationary receptacle unit.

11. The coupling mechanism of claim 10, wherein the suspension mount further comprises a second front crossbar spaced apart from the first front crossbar in a vertical direction.

12. The coupling mechanism of claim 11, wherein the suspension mount further comprises a second rear crossbar spaced apart from the first rear crossbar in a vertical direction.

13. The coupling mechanism of claim 10, wherein the equipment rack comprises two carrier profiles that are connected to each other via the crossbars.

14. The coupling mechanism of claim 1, wherein the link defines a recess at an end of the link through which the bolt is located when the receptacle is in a lifted position.

15. A hospital room medical equipment rack transfer system comprising a stationary rack mount disposed within a hospital room;

a mobile equipment cart sized to be wheeled into and out of the room; and an equipment rack adapted to support a variety of medical equipment coupled to a patient and including a support member;

wherein the stationary rack mount includes a first coupler adapted to receive the support member of the equipment rack to secure the equipment rack;

wherein the mobile equipment cart includes a second coupler adapted to receive the support member of the equipment rack to secure the equipment rack to the mobile equipment cart to move the equipment rack into or out of the room; and wherein the second coupler is adapted to be vertically moved with respect to the mobile equipment rack to release the equipment rack from the stationary rack mount; the system further comprising a swivel member coupled to the second coupler and adapted to swivel about a fixed swivel axis and thereby move the second coupler vertically, such that the second coupler releases the equipment from the stationary rack mount and secures the equipment rack to the mobile equipment cart;

wherein the swivel comprises a bolt substantially parallel to and located at a distance from the swivel axis, wherein the bolt engages a substantially horizontal slot of the second coupler, such that swivel motion of the swivel member about the swivel axis is converted into vertical motion of the second coupler.

16. A method of transferring a medical equipment rack from a hospital room with an attached patient, the method comprising (a) providing a mobile equipment cart having a coupling mechanism adapted to receive a support member of the equipment rack to secure the equipment rack to the mobile equipment cart to move the equipment rack with the patient into or out of the room, the coupling mechanism comprising;

a suspension mount disposed on the equipment rack;

a first receptacle element disposed on the stationary receptacle unit and configured to receive the suspension mount of the equipment rack to support the equipment rack on the stationary receptacle unit;

a second receptacle element, disposed on the mobile equipment cart and configured to receive the suspension of the equipment rack to support the equipment rack on the equipment cart, wherein the second receptacle element comprises a coupling link extending essentially in a horizontal direction and the second receptacle element is movable along a column of the equipment cart, the column comprising a spacing element extending in parallel to the coupling link, and a swivel attached to the spacing element at a swivel axis about which the swivel is adapted to be pivoted, wherein the swivel comprises a bolt disposed at a distance from the swivel axis and extending essentially in a horizontal direction through the coupling link;

(b) moving the mobile equipment cart into a coupling position adjacent the equipment rack while the equipment rack is secured to a stationary rack mount in the hospital room;

(c) operating a handle of the mobile equipment cart to simultaneously couple the equipment rack to the mobile equipment cart and release the equipment rack from the stationary rack mount while a patient is connected to equipment on the equipment rack; and then (d) wheeling the mobile equipment cart and coupled equipment rack from the room with the connected patient.

17. The method of claim 16, wherein the operating the handle consists essentially of pivoting the handle about a swivel axis.

18. A coupling mechanism for selectively coupling an equipment rack to a stationary receptacle unit and to a mobile equipment cart, the coupling mechanism comprising:

a suspension mount disposed on the equipment rack, the suspension mount comprising a first front crossbar adapted for coupling to the mobile equipment cart, and a first near crossbar adapted for coupling to the stationary receptacle unit;

a first receptacle element disposed on the stationary receptacle unit and configured to receive the suspension mount of the equipment rack to support the equipment rack on the stationary receptacle unit; and a second receptacle element disposed on the mobile equipment cart and configured to receive the suspension mount of the equipment rack to support the equipment rack on the equipment cart, wherein the second receptacle element is movable along a column of the equipment cart.

19. The coupling mechanism of claim 18, wherein the crossbars extend essentially in a horizontal direction.

20. The coupling mechanism of claim 18, wherein the second receptacle element is essentially movable in a vertical direction along the column of the equipment cart.

21. The coupling mechanism of claim 18, wherein the column defines a vertical slot through which the second receptacle slides.

22. The coupling mechanism of claim 18, wherein the second receptacle element comprises two vertically spaced receptacle adapted for receiving the suspension mount.

23. The coupling mechanism of claim 22, wherein the vertically spaced receptacles each comprise a hook for receiving the suspension mount.

24. The coupling mechanism of claim 18, wherein the suspension mount further comprises a second front crossbar spaced apart from the first crossbar in a vertical direction.

25. The coupling mechanism of claim 22, wherein the suspension mount further comprises a second rear crossbar spaced apart from the rear crossbar in a vertical direction.

26. The coupling mechanism of claim 18, wherein the equipment rack comprises two carrier profiles that are connected to each via the crossbars.

* * * * *